J. W. THURMAN.
Side-Hill Plow.
No. 6,677. Patented Aug. 28, 1849.
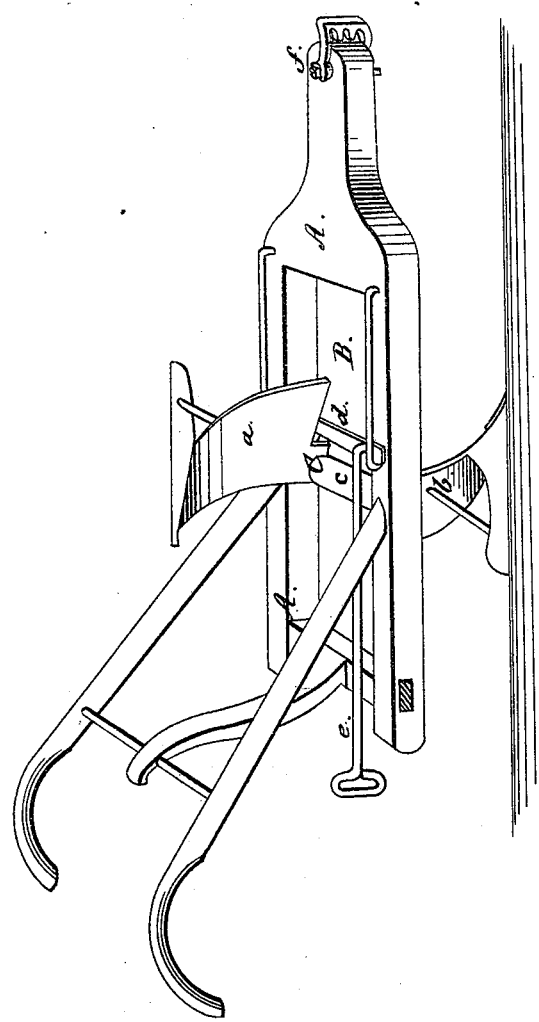

UNITED STATES PATENT OFFICE.

JNO. W. THURMAN, OF BUCHANAN, VIRGINIA.

IMPROVEMENT IN HILLSIDE-PLOWS.

Specification forming part of Letters Patent No. 6,677, dated August 28, 1849.

*To all whom it may concern:*

Be it known that I, JOHN W. THURMAN, of Buchanan, in the county of Lewis and State of Virginia, have invented, made, and applied to use a new and useful Hillside-Plow; and I do hereby declare that the following is a full and exact description, reference being had to the accompanying drawing, which represents a perspective view of my plow.

My invention consists in attaching a right and a left hand mold-board, with their respective shares, &c., to the opposite sides of a revolving shaft extending across the beam, so that they may be turned to place either share beneath the beam, where it is secured by a sliding stop in the proper position to turn the furrow, which may thus be thrown to the right or left as the operator desires.

In the drawing, A is the beam of the plow, which is made very broad, and has an opening, B in its center, in which the double plow C turns. The last consists of right (*a*) and a left hand (*b*) mold-board attached to opposite sides of a shaft, *c*, which is supported at each extremity in the opposite sides of the central opening. Each mold-board may be furnished with a suitable landside and share. A sliding bar, *d*, is secured to the top of the beam, and has a handle, *e*, projecting backward from it, by which it can be moved from or toward the point of draft *f*. This bar acts as a stop to prevent the rotation of the double plow. When the plow is at work the bar occupies the position represented in the drawing thus securing the mold-board in its proper position for turning the furrow to the left. When the direction of the plow is reversed the sliding bar is shoved forward, the double plow is turned on its axis to reverse the positions of the mold-boards. The bar is then drawn back, thus securing the mold-board in its position for turning the furrows to the right.

The several parts of the plow may be constructed in any of the usual ways; but I prefer to cast the mold-boards and shaft in one piece upon a rod of wrought iron, the extremities of which project beyond the cast-iron and form the journals upon which the double mold-board turns. The mold-boards may be constructed with or without landsides. In the latter case they will act as cultivators.

What I claim as my invention, and desire to secure by Letters Patent, is—

The double or right and left hand mold-boards *a* and *b*, revolving upon a horizontal shaft, *c*, placed across the beam A, as herein described, using for that purpose cast or wrought iron or any other material that will answer the desired purpose.

JOHN W. THURMAN.

Witnesses:
W. W. JACKSON,
F. HOPKINS.